US012618528B2

(12) United States Patent
Takano et al.

(10) Patent No.: US 12,618,528 B2
(45) Date of Patent: May 5, 2026

(54) PRESSURE ACCUMULATOR

(71) Applicant: JFE STEEL CORPORATION, Tokyo (JP)

(72) Inventors: Toshio Takano, Tokyo (JP); Hiroshi Okano, Tokyo (JP); Shusaku Takagi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 36 days.

(21) Appl. No.: 18/563,682

(22) PCT Filed: Jun. 9, 2022

(86) PCT No.: PCT/JP2022/023230
§ 371 (c)(1),
(2) Date: Nov. 22, 2023

(87) PCT Pub. No.: WO2022/260114
PCT Pub. Date: Dec. 15, 2022

(65) Prior Publication Data
US 2024/0271760 A1 Aug. 15, 2024

(30) Foreign Application Priority Data
Jun. 10, 2021 (JP) ................................ 2021-097183

(51) Int. Cl.
*F17C 13/06* (2006.01)
*F17C 13/02* (2006.01)

(52) U.S. Cl.
CPC ............ *F17C 13/06* (2013.01); *F17C 13/026* (2013.01); *F17C 2205/0311* (2013.01);
(Continued)

(58) Field of Classification Search
CPC ............................. F17C 13/06; F17C 13/026; F17C 2205/0311; F17C 2205/0355;
(Continued)

(56) References Cited

U.S. PATENT DOCUMENTS 1,732,235 A * 10/1929 Joyce ........................ F17C 1/00
220/240
4,560,232 A * 12/1985 O'Hara .................... B01J 3/002
220/582
(Continued)

FOREIGN PATENT DOCUMENTS

CN 105387295 A 3/2016
GB 2 277 370 A 10/1994
(Continued)

OTHER PUBLICATIONS

English Machine Translation of JP-2015158243-A (Year: 2015).*
(Continued)

*Primary Examiner* — Laura E. Parker
(74) *Attorney, Agent, or Firm* — Oliff PLC

(57) ABSTRACT

A pressure accumulator includes a cylindrical body made of metal and configured to vaporize and store a liquefied gas in a storage space in the cylindrical body, a lid body having a through hole that allows a pipe to penetrate through the through hole, and being configured to close an opening end portion of the cylindrical body with a gap between the lid body and an inner peripheral surface of the cylindrical body, a sealing structure portion between an outer peripheral portion of the lid body and an inner peripheral portion of the cylindrical body, and a fixing part at the opening end portion of the cylindrical body, an outer peripheral surface of the fixing part being screw fastened to the inner peripheral surface of the cylindrical body to support and fix the lid body from an outer side of the lid body.

16 Claims, 3 Drawing Sheets

(52) U.S. Cl.
CPC ........................... *F17C 2205/0355* (2013.01); *F17C 2221/012* (2013.01); *F17C 2223/0161* (2013.01); *F17C 2225/0123* (2013.01); *F17C 2250/0439* (2013.01)

(58) Field of Classification Search
CPC ........ F17C 2221/012; F17C 2223/0161; F17C 2250/0439; F17C 2201/0119; F17C 2201/0138; F17C 2203/0639; F17C 2203/0643; F17C 2203/0648; F17C 2205/0305; F17C 2209/234; F17C 2223/036; F17C 2225/036; F15B 1/04
USPC ........................................................... 220/581
See application file for complete search history.

(56) References Cited

U.S. PATENT DOCUMENTS 7,032,768 B2 * 4/2006 Felbaum ................... F17C 1/02 220/582
2003/0189053 A1 * 10/2003 Felbaum ................. F17C 13/06 220/582
2009/0126942 A1 * 5/2009 Kimiadi ............... H02G 15/013 166/66
2014/0158250 A1 6/2014 Downie et al.
2016/0061363 A1 * 3/2016 Hobein ................. F16L 19/065 285/192
2019/0049069 A1 2/2019 Wada et al.
2019/0086029 A1 3/2019 Wada et al.
2020/0340625 A1 10/2020 Wada et al.
2021/0348724 A1 * 11/2021 Wada ...................... F17C 13/04
2021/0381646 A1 * 12/2021 Hosoya ..................... F17C 1/00

FOREIGN PATENT DOCUMENTS

JP 2015158243 A * 9/2015
JP 2017-141919 A 8/2017
JP 2019-044967 A 3/2019
JP 2019-082188 A 5/2019
JP 2020-56457 A 4/2020
WO 2017/150520 A1 9/2017
WO WO-2018178648 A1 * 10/2018 .............. F17C 13/02

OTHER PUBLICATIONS

Jan. 2, 2025 Examination Report issued in Australian Patent Application No. 2022290088.
Aug. 16, 2024 extended Search Report issued in European Patent Application No. 22820293.3.
Aug. 16, 2022 International Search Report issued in International Patent Application No. PCT/JP2022/023230.
Mar. 24, 2025 Examination Report issued in Australian Patent Application No. 2022290088.
Mar. 15, 2025 Office Action issued in Chilean Patent Application No. 202303569.
Jun. 24, 2025 Office Action issued in Korean Patent Application No. 10-2023-7039883 (with English Translation).
Aug. 1, 2025 Office Action issued in Chinese Patent Application No. 202280039422.2 (with English Translation).

* cited by examiner

PRESSURE ACCUMULATOR

TECHNICAL FIELD

The present disclosure relates to a pressure accumulator that stores vaporized liquefied gas.

BACKGROUND ART

Conventionally, there are various known pressure accumulators that store vaporized liquefied gas therein, and that are already put into practice. In general, liquefied hydrogen that is carried by a liquid hydrogen lorry and that is stored in a storage tank is vaporized by a vaporizer, and is compressed by a compressor into a high pressure and, thereafter, is injected into a pressure accumulator through a pipe. A hydrogen gas pressure accumulator disclosed in the following Patent Literature 1, for example, is configured to include a cylindrical cylinder portion, lid portions, and threaded portions, the cylindrical cylinder portion being made of steel and being configured to store vaporized liquefied gas in the cylindrical cylinder portion, the lid portions being configured to hermetically seal both end portions of the cylindrical cylinder portion in an openable manner, the threaded portions being configured to fix the lid portions to the cylindrical cylinder portion.

CITATION LIST

Patent Literature

Patent Literature 1: Japanese Unexamined Patent Application Publication No. 2019-82188

SUMMARY OF INVENTION

Technical Problem

Adopting a configuration can be considered in which liquefied gas at a very low temperature is injected into a pressure accumulator from the outside through a pipe, and is vaporized therein and is stored in the pressure accumulator, so that a vaporizer is not necessary. However, in the hydrogen gas pressure accumulator disclosed in Patent Literature 1, although the cylindrical cylinder can withstand only approximately −30 degrees C., for example, the temperature of liquid hydrogen is approximately −260 degrees C. and hence, there is a possibility that the temperature of the lid portion is lowered due to the heat conduction caused by liquid hydrogen at a very low temperature flowing through the pipe, thus lowering the temperature of the cylindrical cylinder to which heat is conducted from the lid portion, causing a brittle fracture in the cylindrical ring.

The present disclosure has been made to solve the above-mentioned problem, and it is an object of the present disclosure to provide a pressure accumulator that can vaporize and store liquefied gas without causing a brittle fracture in the cylindrical body even when liquefied gas at a very low temperature is injected into the pressure accumulator from the outside through a pipe.

Solution to Problem

A pressure accumulator according to an embodiment of the present disclosure is a pressure accumulator that causes a liquefied gas at a very low temperature to be injected into the pressure accumulator from an outside through a pipe to vaporize and store the liquefied gas, the pressure accumulator including: a cylindrical body made of metal and configured to vaporize and store the liquefied gas in a storage space in the cylindrical body; a lid body having a through hole that allows the pipe to penetrate through the through hole, the lid body being configured to fix the pipe passing through the through hole, and being configured to close an opening end portion of the cylindrical body with a gap provided between the lid body and an inner peripheral surface of the cylindrical body, the gap communicating with the storage space of the cylindrical body; a sealing structure portion provided between an outer peripheral portion of the lid body and an inner peripheral portion of the cylindrical body, the sealing structure portion being configured to fill in at least a portion of the gap; and a fixing part provided at the opening end portion of the cylindrical body, an outer peripheral surface of the fixing part being screw fastened to the inner peripheral surface of the cylindrical body to support and fix the lid body from an outer side of the lid body.

Advantageous Effects of Invention

According to the embodiment of the present disclosure, the gap is provided between the outer peripheral portion of the lid body and the inner peripheral portion of the cylindrical body, and at least a portion of the gap is filled with the sealing structure portion and hence, the gap serves as a heat-insulating layer, thus suppressing heat conduction from the lid body to the cylindrical body and suppressing a brittle fracture in the cylindrical body. Accordingly, by causing liquefied gas at a very low temperature to be injected into the pressure accumulator from the outside through a pipe, it is possible to vaporize and store the liquefied gas.

DESCRIPTION OF EMBODIMENTS

Hereinafter, Embodiments will be described with reference to drawings. In the respective drawings, identical or corresponding components are given the same reference symbols, and the description of such components is omitted or simplified when appropriate. The shapes, the sizes, the arrangement, and the like of the components described in the respective drawings may be suitably changed within the scope of the present disclosure.

Embodiment 1

Figure 1:
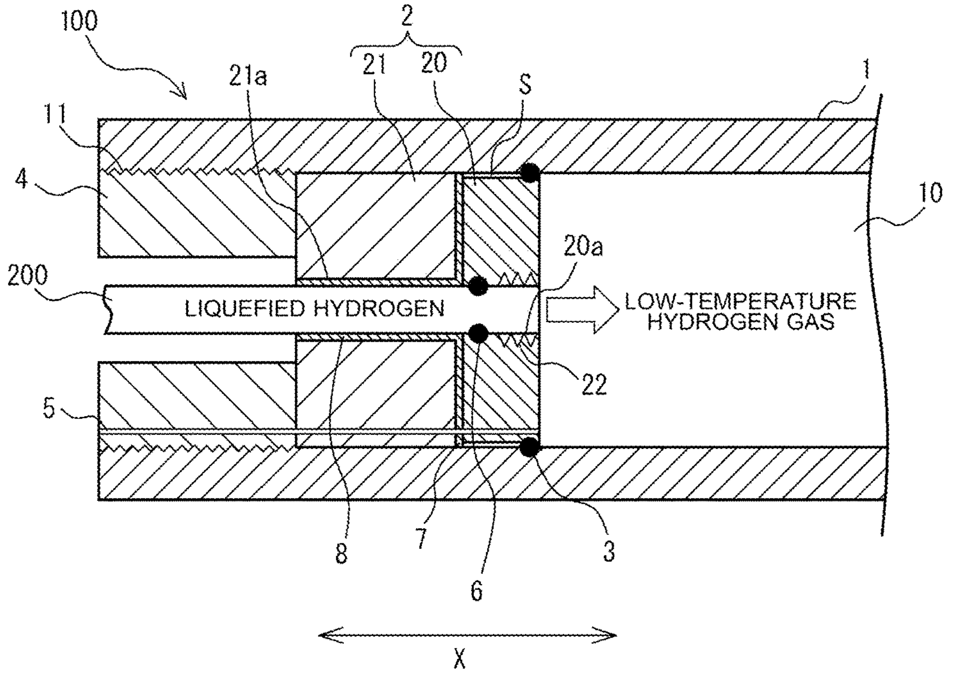
FIG. 1 is a cross-sectional view schematically showing the internal structure of one end of a pressure accumulator according to Embodiment 1.

FIG. 1 is a cross-sectional view schematically showing the internal structure of one end of a pressure accumulator according to Embodiment 1. A pressure accumulator 100 according to Embodiment 1 causes liquefied gas at a very low temperature to be injected into the pressure accumulator 100 from the outside through a pipe 200 to vaporize and store the liquefied gas. In Embodiment 1, the description will be made by taking, as an example, the case in which the liquid gas is liquefied hydrogen, for example. Liquefied hydrogen at a very low temperature is at approximately −260 degrees C., for example. The liquid gas is not limited to liquefied hydrogen, and may be liquid nitrogen or liquid helium, for example. In the case in which the liquid gas is liquefied hydrogen, the pressure accumulator 100 is installed at a hydrogen station or the like at which hydrogen is supplied to vehicles, for example.

(Pressure Accumulator 100)

As shown in FIG. 1, the pressure accumulator 100 includes a cylindrical body 1 made of metal, a lid body 2 that closes the opening end portion of the cylindrical body 1, a sealing structure portion 3 provided between the outer peripheral portion of the lid body 2 and the inner peripheral portion of the cylindrical body 1, a fixing part 4 that supports and fixes the lid body 2 from the outer side of the lid body 2, and a temperature detection unit 5.

(Cylindrical Body 1)

The cylindrical body 1 is configured to vaporize liquefied hydrogen in a storage space 10 in the cylindrical body 1 to store hydrogen gas therein. The inner wall surface of the pressure accumulator 100 is a portion that comes into contact with liquefied hydrogen and hydrogen gas. A liquefied gas at a very low temperature is injected into the storage space 10 of the cylindrical body 1 from the outside through the pipe 200. The pipe 200 is made of austenitic stainless steel, for example. The reason is that austenitic stainless steel is excellent in brittleness resistance against liquid hydrogen, and can ensure strength against very low temperatures. Hydrogen gas stored in the storage space 10 of the cylindrical body 1 is supplied to vehicles or the like through a pipe communicating with the outside.

The cylindrical body 1 is made of low alloy steel, for example. Examples of the low alloy steel include chromium-molybdenum steel, nickel-chromium-molybdenum steel, manganese-chromium steel, manganese steel, or boron-added steel. The cylindrical body 1 has a cylindrical shape having both ends open, and a female screw portion 11 is formed on the inner peripheral surface at each of both end portions of the cylindrical body 1. The cylindrical body 1 may have a bottomed cylindrical shape having only one end open, for example. Alternatively, the cylindrical body 1 is not limited to a cylindrical shape, and may have any of other shapes, such as a square cylindrical shape. The outer surface of the cylindrical body 1 may be covered by carbon fiber reinforced plastics (CFRP), being a material other than metal. From the viewpoint of vaporization efficiency, the ratio in wall thickness between a CFRP layer and the cylindrical body 1 (the thickness of the CFRP layer/the thickness of the cylindrical body 1) is preferably 50% or less, and is more preferably 25% or less. The reason is that when the CFRP layer has an excessively large wall thickness, a heat insulating effect becomes conspicuous, thus lowering the vaporization efficiency of liquefied hydrogen.

(Lid Body 2)

The lid body 2 closes the opening end portion of the cylindrical body 1. The lid body 2 is made of austenitic stainless steel, and includes an inner lid body 20 and an outer lid body 21, the inner lid body 20 being disposed at a position close to the storage space 10 of the cylindrical body 1, the outer lid body 21 being made of low alloy steel, and being disposed at a position close to the fixing part 4 of the cylindrical body 1. The inner lid body 20 has a through hole **20*a* that allows the pipe 200 to penetrate therethrough, and the pipe 200 that penetrates through the through hole 20*a* is fixed to the inner lid body 20. The outer lid body 21 has a through hole 21*a* that allows the pipe 200** to penetrate therethrough.

The inner lid body 20 faces the storage space 10 of the cylindrical body 1, and is always in a state of being exposed to liquid hydrogen at a very low temperature. However, the inner lid body 20 is made of austenitic stainless steel, thus being excellent in brittleness resistance against liquid hydrogen, and ensuring strength against very low temperatures. Provided that the inner lid body 20 is excellent in brittleness resistance against liquid hydrogen and can withstand very low temperatures, the inner lid body 20 may be made of other materials. The inner lid body 20 has a length of approximately 30 mm in an axial direction X of the cylindrical body 1, for example. The reason is that a length of approximately 30 mm allows the inner lid body 20 to have sufficient strength against liquid hydrogen. However, the length of the inner lid body 20 is not limited to approximately 30 mm, and is designed by suitably changing the length of the inner lid body 20 according to the size and the shape of the cylindrical body 1.

The inner lid body 20 includes a screw fastening portion 22 that causes the pipe 200 passing through the through hole **20*a* to be fixed by screw fastening. Specifically, a female screw is formed at the inner peripheral portion of the through hole 20*a* of the inner lid body 20, and a male screw that is fastened to the female screw of the inner lid body 20 is formed at the outer peripheral portion of the pipe 200. By causing the inner lid body 20 and the pipe 200 to be screw fastened to each other, it is possible to surely fix the pipe 200 against the internal pressure of hydrogen gas stored in the storage space 10 of the cylindrical body 1**.

A sealing part 6 is provided between the inner peripheral portion of the inner lid body 20 and the outer peripheral portion of the pipe 200. This is to prevent a situation in which hydrogen gas stored in the storage space 10 of the cylindrical body 1 leaks to the outside through a space formed between the inner peripheral portion of the inner lid body 20 and the outer peripheral portion of the pipe 200. The sealing part 6 may be an O-ring, for example. However, the sealing part 6 is not limited to the O-ring. Provided that the sealing part 6 can prevent a situation in which hydrogen gas stored in the storage space 10 of the cylindrical body 1 leaks through a space formed between the inner peripheral portion of the inner lid body 20 and the outer peripheral portion of the pipe 200, the sealing part 6 may be formed by other members.

The inner lid body 20 is fitted in the opening end portion of the cylindrical body 1 with a gap S provided between the inner lid body 20 and the inner peripheral surface of the cylindrical body 1, the gap S communicating with the storage space 10 of the cylindrical body 1. The gap S is set to approximately 0.5 mm, for example, and is provided along the axial direction X of the cylindrical body 1. By causing the gap S to serve as a heat-insulating layer, it is possible to suppress a situation in which the temperature of the cylindrical body 1 is lowered by the inner lid body 20 having a low temperature due to the heat conduction from the pipe 200 through which liquid hydrogen at a very low temperature passes. Further, by providing the gap S, it is possible to fit the inner lid body 20 into the opening end portion of the cylindrical body 1.

The outer lid body 21 is provided to increase strength against the internal pressure of hydrogen gas in the cylindrical body 1. The reason is that there may be a case in which only the inner lid body 20 having a length of approximately 30 mm in the axial direction X cannot obtain sufficient strength against the internal pressure of hydrogen gas. The outer lid body 21 is made of low alloy steel, such as chromium-molybdenum steel, nickel-chromium-molybdenum steel, manganese-chromium steel, manganese steel, or boron-added steel. The low alloy steel is a lower cost than austenitic stainless steel, thus contributing to a reduction in manufacturing costs. The material of the outer lid body 21 is not limited to low alloy steel. Provided that the outer lid body 21 can increase strength against the internal pressure of hydrogen gas stored in the storage space 10 of the cylindrical body 1, the outer lid body 21 may be made of other materials.

A heat insulating part 7 is provided between the inner lid body 20 and the outer lid body 21. This is to prevent heat conduction from the inner lid body 20 to the outer lid body 21. A heat insulating part 8 is also provided between the outer lid body 21 and the pipe 200. This is to prevent heat conduction of the very low temperature of the pipe 200 to the outer lid body 21, liquid hydrogen at a very low temperature passing through the pipe 200. The reason is that when the temperature of the outer lid body 21, which is made of low alloy steel, is lowered due to the heat conduction of very low temperatures, there is a possibility of occurrence of a brittle fracture in the outer lid body 21. An example of the material of the heat insulating parts 7 and 8 is ceramic.

(Sealing Structure Portion 3)

The sealing structure portion 3 is provided between the outer peripheral portion of the inner lid body 20 and the inner peripheral portion of the cylindrical body 1 to fill in at least a portion of the gap S. The sealing structure portion 3 is a sealing part made of a resin or metal, such as an O-ring, for example. By providing the sealing structure portion 3, it is possible to prevent a situation in which hydrogen gas stored in the storage space 10 of the cylindrical body 1 leaks to the outside through the gap S. Filling in at least a portion of the gap S refers to filling in the entire gap S or filling in a portion of the gap S. It is preferable that, as shown in the drawing, a portion of the gap S be the end portion of the gap S at a position close to the storage space 10 of the cylindrical body 1. However, a portion of the gap S may be the end portion of the gap S at a position close to the outer lid body 21 or may be an intermediate portion of the gap S, for example. The sealing structure portion 3 is not limited to an O-ring. Provided that the sealing structure portion 3 can prevent hydrogen gas stored in the storage space 10 of the cylindrical body 1 from flowing into the gap S formed between the outer peripheral portion of the inner lid body 20 and the inner peripheral portion of the cylindrical body 1, the sealing structure portion 3 may be formed by other members. For example, the sealing structure portion 3 may be a member, such as a metal hollow O-ring that can provide sealing by a combination of metal and a resin. In the case in which an O-ring made of a resin is used, it is preferable to use an O-ring with a cold temperature limit of −30 degrees C. or less, and it is more preferable to use an O-ring with a cold temperature limit of −50 degrees C. or less.

(Fixing Part 4)

The fixing part 4 is provided at the opening end portion of the cylindrical body 1, and the outer peripheral surface of the fixing part 4 is screw fastened to the inner peripheral surface of the cylindrical body 1 to support and fix the lid body 2 from the outer side of the storage space 10. Specifically, the fixing part 4 is a gland nut having an outer peripheral surface thereof provided with a male screw portion that is to be screw fastened to the female screw portion 11 of the cylindrical body 1. When the fixing part 4 is screw fastened to the cylindrical body 1, the position of the fixing part 4 in the axial direction X is fixed. One end surface of the fixing part 4 abuts against the outer surface of the outer lid body 21 of the lid body 2 on which an axial force in the axial direction X acts due to high-pressure hydrogen gas stored in the storage space 10, so that the fixing part 4 can support the lid body 2. The pipe 200 passes through the hollow hole of the fixing part 4. The thickness of the fixing part 4 in the radial direction may be suitably determined. However, the fixing part 4 has a structure that supports pressure received by the inner lid body 20 and hence, when the fixing part 4 has an extremely small wall thickness in the radial direction, the fixing part 4 cannot sufficiently support the lid body 2. For this reason, the thickness of the fixing part 4 in the radial direction is preferably set to a wall thickness that can ensure an area capable of supporting 40% or more of the area of the inner lid body 20 that receives pressure, and is more preferably set to a wall thickness that can ensure an area capable of supporting 60% or more of the area of the inner lid body 20 that receives pressure. For example, assuming that the diameter of the inner lid body 20 is 300 mm, the area of the inner lid body 20 that receives pressure is 70650 $mm^2$. The area of the inner lid body 20 is calculated in a state that includes a portion in which the pipe 200 penetrates. However, in an actual calculation, it is desirable to perform the calculation in a state that excludes the portion in which the pipe 200 penetrates. In contrast, assuming that the wall thickness of the fixing part 4 is 50 mm, an area supported by the fixing part 4 is 39250 $mm^2$. In this case, the fixing part 4 can ensure an area capable of supporting 56% of the area of the inner lid body 20 that receives pressure.

(Temperature Detection Unit 5)

The temperature detection unit 5 may be a thermocouple, for example, and detects the temperature of hydrogen gas stored in the storage space 10 of the cylindrical body 1, or the temperature of the inner lid body 20. In the pressure accumulator 100 according to Embodiment 1, the temperature of hydrogen gas stored in the cylindrical body 1 or the temperature of the inner lid body 20 is monitored by using the temperature detection unit 5. In the pressure accumulator 100, conditions of liquid hydrogen to be injected from the pipe 200 are determined based on the detected value from the temperature detection unit 5. The conditions of liquid hydrogen include flow rate, flow velocity, injection time, and the like. The pressure accumulator 100 includes a control unit, and is configured such that the control unit determines conditions of liquid hydrogen based on the detected value from the temperature detection unit 5 to adjust the flow rate and the like of liquefied hydrogen that passes through the pipe 200. Although it is desirable for the pressure accumulator 100 to be provided with the temperature detection unit 5, the temperature detection unit 5 is not always necessary to be provided, and may be omitted.

Figure 2:
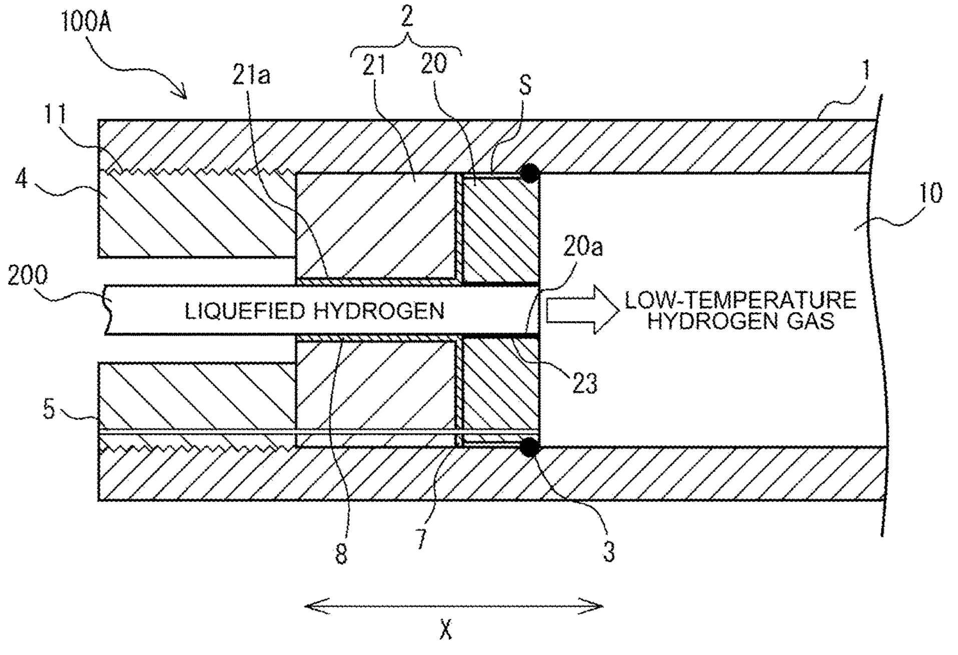
FIG. 2 is a cross-sectional view schematically showing the internal structure of one end of a modification of the pressure accumulator according to Embodiment 1.

FIG. 2 is a cross-sectional view schematically showing the internal structure of one end of a modification of the pressure accumulator according to Embodiment 1. In the pressure accumulator 100 shown in FIG. 1, the inner lid body 20 includes the screw fastening portion 22 that causes the pipe 200 passing through the through hole **20*a* to be fixed by screw fastening. In contrast, in a pressure accumulator 100A shown in FIG. 2, the inner lid body 20 is configured to include a welding-fixing portion 23 that causes the pipe 200 passing through the through hole 20***a* to be fixed by welding. The welding-fixing portion 23 may be provided to the entire inner lid body 20 along the axial direction X, or may be provided to a portion of the inner lid body 20 along the axial direction X. In this case, a space formed between the inner peripheral portion of the inner lid body 20 and the outer peripheral portion of the pipe 200 is completely closed and hence, the sealing part 6 shown in FIG. 1 is unnecessary.

Adopting a configuration can be considered in which liquefied gas at a very low temperature is injected into the pressure accumulator 100 from the outside through the pipe 200, and is vaporized therein and is stored in the pressure accumulator 100, so that a vaporizer is not necessary. However, although the cylindrical body 1 can withstand only approximately −30 degrees C., for example, the temperature of liquid hydrogen is approximately −260 degrees C., for example. Accordingly, when liquid hydrogen is injected into the pressure accumulator 100, the temperature of the lid body 2 is lowered due to the heat conduction caused by the liquid hydrogen at a very low temperature that flows through the pipe 200, thus causing the temperature of the cylindrical body 1 to be lowered due to the heat conduction from the lid body 2 and hence, there is a possibility of occurrence of a brittle fracture in the cylindrical body 1.

In view of the above, as described above, the pressure accumulator 100 according to Embodiment 1 includes the cylindrical body 1 made of metal and the lid body 2, the cylindrical body 1 being configured to vaporize and store liquefied gas in the storage space 10 in the cylindrical body 1, the lid body 2 having the through holes 20*a* and 21*a* that allow the pipe 200 to penetrate therethrough, the lid body 2 fixing the pipe 200 passing through the through holes 20*a* and 21*a*, the lid body 2 closing the opening end portion of the cylindrical body 1 with the gap S formed between the lid body 2 and the inner peripheral surface of the cylindrical body 1, the gap S communicating with the storage space 10 of the cylindrical body 1. The pressure accumulator 100 according to Embodiment 1 also includes the sealing structure portion 3 and the fixing part 4, the sealing structure portion 3 being provided between the outer peripheral portion of the lid body 2 and the inner peripheral portion of the cylindrical body 1 to fill in at least a portion of the gap S, the fixing part 4 being provided at the opening end portion of the cylindrical body 1, the outer peripheral surface of the fixing part 4 being screw fastened to the inner peripheral surface of the cylindrical body 1 to support and fix the lid body 2 from the outer side of the lid body 2.

As described above, in the pressure accumulator 100 according to Embodiment 1, the gap S is provided between the outer peripheral portion of the lid body 2 and the inner peripheral portion of the cylindrical body 1, and at least a portion of the gap S is filled by the sealing structure portion 3 and hence, the gap S serves as a heat-insulating layer, thus suppressing heat conduction from the lid body 2 to the cylindrical body 1. That is, it is possible to suppress a situation in which the temperature of the cylindrical body 1 is lowered by the lid body 2 having a low temperature due to the heat conduction from the pipe 200 through which liquid hydrogen at a very low temperature passes and hence, a brittle fracture in the cylindrical body 1 can be suppressed. Accordingly, by causing liquefied gas at a very low temperature to be injected into the pressure accumulator 100 according to Embodiment 1 from the outside through the pipe 200, it is possible to vaporize and store the liquefied gas in the pressure accumulator 100.

The lid body 2 includes the screw fastening portion 22 that causes the pipe 200 passing through the through holes 20*a* and 21*a* to be fixed by screw fastening. The sealing part 6 that closes a space formed between the inner peripheral portion of the lid body 2 and the outer peripheral portion of the pipe 200 is provided between the inner peripheral portion of the lid body 2 and the outer peripheral portion of the pipe 200. Accordingly, it is possible to surely fix the pipe 200 against the internal pressure of hydrogen gas stored in the storage space 10 of the cylindrical body 1. It is also possible to prevent a situation in which hydrogen gas stored in the storage space 10 of the cylindrical body 1 leaks to the outside through a space formed between the inner peripheral portion of the inner lid body 20 and the outer peripheral portion of the pipe 200.

The lid body 2 includes the inner lid body 20 and the outer lid body 21, the inner lid body 20 being made of austenitic stainless steel, and being disposed at a position close to the storage space 10 of the cylindrical body 1, the outer lid body 21 being made of low alloy steel, and being disposed at a position close to the fixing part 4. Accordingly, although the inner lid body 20 faces the storage space 10 of the cylindrical body 1, and is always in a state of being exposed to liquid hydrogen at a very low temperature, the inner lid body 20 is made of austenitic stainless steel, thus being excellent in brittleness resistance against liquid hydrogen, and ensuring strength against very low temperatures. Strength against the internal pressure of hydrogen gas in the cylindrical body 1 can be increased by the outer lid body 21. Further, using low alloy steel that is a lower cost than austenitic stainless steel contributes to a reduction in manufacturing costs.

The heat insulating part 7 is provided between the inner lid body 20 and the outer lid body 21, and the heat insulating part 8 is provided between the outer lid body 21 and the pipe 200. Accordingly, heat conduction from the inner lid body 20 to the outer lid body 21 can be prevented, and it is also possible to prevent a situation in which the very low temperature of the pipe 200 through which liquid hydrogen at a very low temperature passes is conducted to the outer lid body 21 and hence, it is possible to prevent brittle damage of the outer lid body 21 caused by the lowering of the temperature.

Each of the pressure accumulators 100 and 100A according to Embodiment 1 includes the temperature detection unit 5 configured to detect the temperature of liquefied gas, which is vaporized, stored in the storage space 10 of the cylindrical body 1, or the temperature of the lid body 2. Accordingly, in the pressure accumulators 100 and 100A according to Embodiment 1, the temperature of hydrogen gas stored in the cylindrical body 1, or the temperature of the inner lid body 20 can be monitored by using the temperature detection unit 5, and it is possible to determine conditions of liquid hydrogen to be injected from the pipe 200 based on the detected value from the temperature detection unit 5.

Embodiment 2

Figure 3:
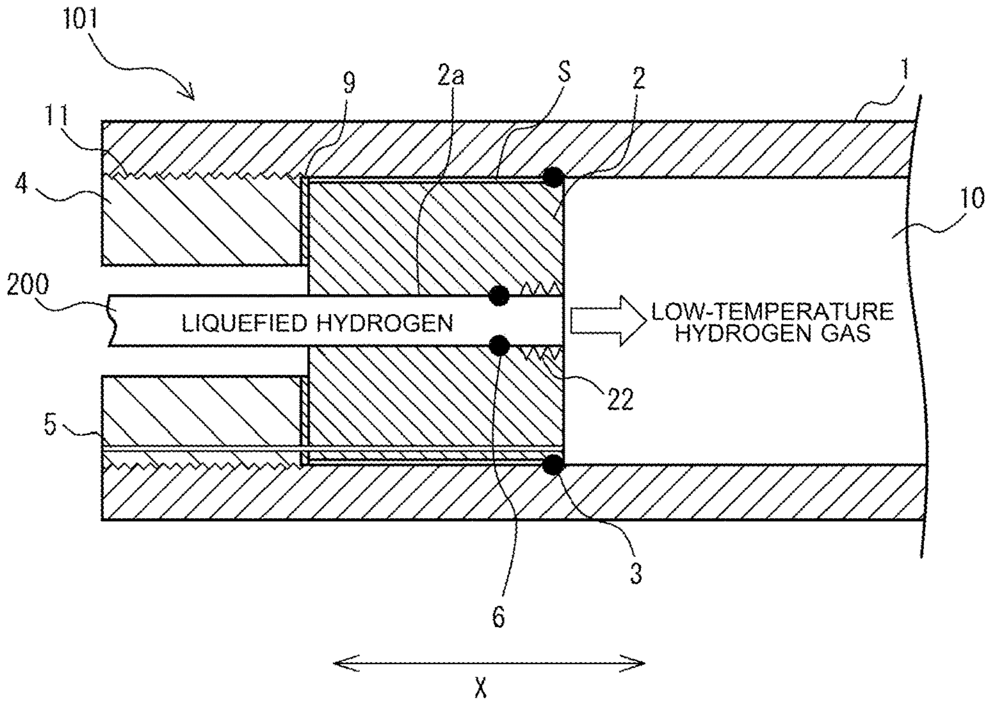
FIG. 3 is a cross-sectional view schematically showing the internal structure of one end of a pressure accumulator according to Embodiment 2.

Next, a pressure accumulator 101 according to Embodiment 2 will be described with reference to FIG. 3. FIG. 3 is a cross-sectional view schematically showing the internal structure of one end of the pressure accumulator according to Embodiment 2. Constitutional elements identical to the corresponding constitutional elements of the pressure accumulator 100 described in Embodiment 1 are given the same reference symbols, and the description of such constitutional elements will be omitted when appropriate.

(Lid Body 2)

The pressure accumulator 101 according to Embodiment 2 differs from the pressure accumulator 100 described in the above-mentioned Embodiment 1 in the configuration of the lid body 2. A lid body 2 of the pressure accumulator 101 according to Embodiment 2 is made of only austenitic stainless steel.

The lid body 2 includes a screw fastening portion 22 that causes a pipe 200 passing through a through hole 2*a* to be fixed by screw fastening. Specifically, a female screw is formed at the inner peripheral portion of the through hole 2*a* of the lid body 2, and a male screw that is fastened to the screw of the lid body 2 is formed at the outer peripheral portion of the pipe 200. The lid body 2 includes the screw fastening portion 22 that causes the lid body 2 to be screw fastened to the pipe 200 and hence, it is possible to surely fix the pipe 200 against the internal pressure of hydrogen gas stored in the storage space 10 of the cylindrical body 1.

A sealing part 6 that closes a space formed between the inner peripheral portion of the lid body 2 and the outer peripheral portion of the pipe 200 is provided between the inner peripheral portion of the lid body 2 and the outer peripheral portion of the pipe 200. This is to prevent a situation in which hydrogen gas stored in the storage space 10 of the cylindrical body 1 leaks to the outside through a gap formed between the inner peripheral portion of the lid body 2 and the outer peripheral portion of the pipe 200. The sealing part 6 may be an O-ring, for example. However, the sealing part 6 is not limited to an O-ring. Provided that the sealing part 6 can prevent a situation in which hydrogen gas stored in the storage space 10 of the cylindrical body 1 leaks through a gap formed between the inner peripheral portion of the lid body 2 and the outer peripheral portion of the pipe 200, the sealing part 6 may be formed by other members.

A heat insulating part 9 is provided between the lid body 2 and the fixing part 4. This is to prevent heat conduction from the lid body 2 to the fixing part 4. The reason is that when the temperature of the fixing part 4 is lowered due to the heat conduction of very low temperatures, there is a possibility of occurrence of a brittle fracture in the fixing part 4. An example of the material of the heat insulating part 9 is ceramic. However, in the case in which the lid body 2 has a large length in the axial direction, so that heat conduction from the lid body 2 to the fixing part 4 will not occur, the heat insulating part 9 may be omitted.

Figure 4:
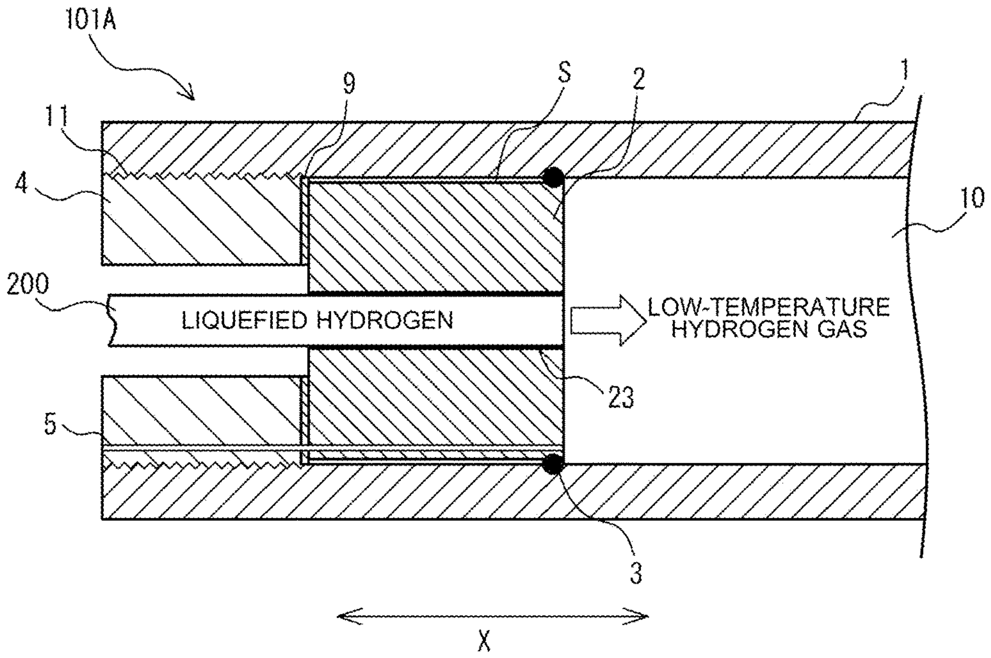
FIG. 4 is a cross-sectional view schematically showing the internal structure of one end of a modification of the pressure accumulator according to Embodiment 2.

FIG. 4 is a cross-sectional view schematically showing the internal structure of one end of a modification of the pressure accumulator according to Embodiment 2. In the pressure accumulator 101 shown in FIG. 3, the lid body 2 includes the screw fastening portion 22 that causes the pipe 200 passing through the through hole 2*a* to be fixed by screw fastening. In contrast, in a pressure accumulator 101A shown in FIG. 4, the lid body 2 is configured to include a welding-fixing portion 23 that causes the pipe 200 passing through the through hole 2*a* to be fixed by welding. The welding-fixing portion 23 may be provided to the entire lid body 2 along the axial direction X, or may be provided to a portion of the lid body 2 along the axial direction X. In this case, a space formed between the inner peripheral portion of the lid body 2 and the outer peripheral portion of the pipe 200 is completely closed and hence, the sealing part 6 shown in FIG. 3 is unnecessary.

As described above, also in each of the pressure accumulators 101 and 101A according to Embodiment 2, the gap S is provided between the outer peripheral portion of the lid body 2 and the inner peripheral portion of the cylindrical body 1, and at least a portion of the gap S is filled by the sealing structure portion 3 and hence, the gap S serves as a heat-insulating layer, thus suppressing heat conduction from the lid body 2 to the cylindrical body 1. That is, it is possible to suppress a situation in which the temperature of the cylindrical body 1 is lowered by the lid body 2 having a low temperature due to the heat conduction from the pipe 200 through which liquid hydrogen at a very low temperature passes. Accordingly, by causing liquefied gas at a very low temperature to be injected into the pressure accumulator 101 according to Embodiment 2 from the outside through the pipe 200, it is possible to vaporize and store the liquefied gas in the pressure accumulator 101.

The lid body 2 is made of austenitic stainless steel. Accordingly, although the lid body 2 faces the storage space 10 of the cylindrical body 1, and is always in a state of being exposed to liquid hydrogen at a very low temperature, the lid body 2 is made of austenitic stainless steel, thus being excellent in brittleness resistance against liquid hydrogen, and ensuring strength against very low temperatures.

Each of the pressure accumulators 101 and 101A according to Embodiment 2 includes a heat insulating part 9 provided between the lid body 2 and the fixing part 4. Accordingly, heat conduction from the lid body 2 to the fixing part 4 can be prevented and hence, it is possible to prevent brittle damage of the fixing part 4 caused by the lowering of the temperature.

Embodiment 3

Figure 5:
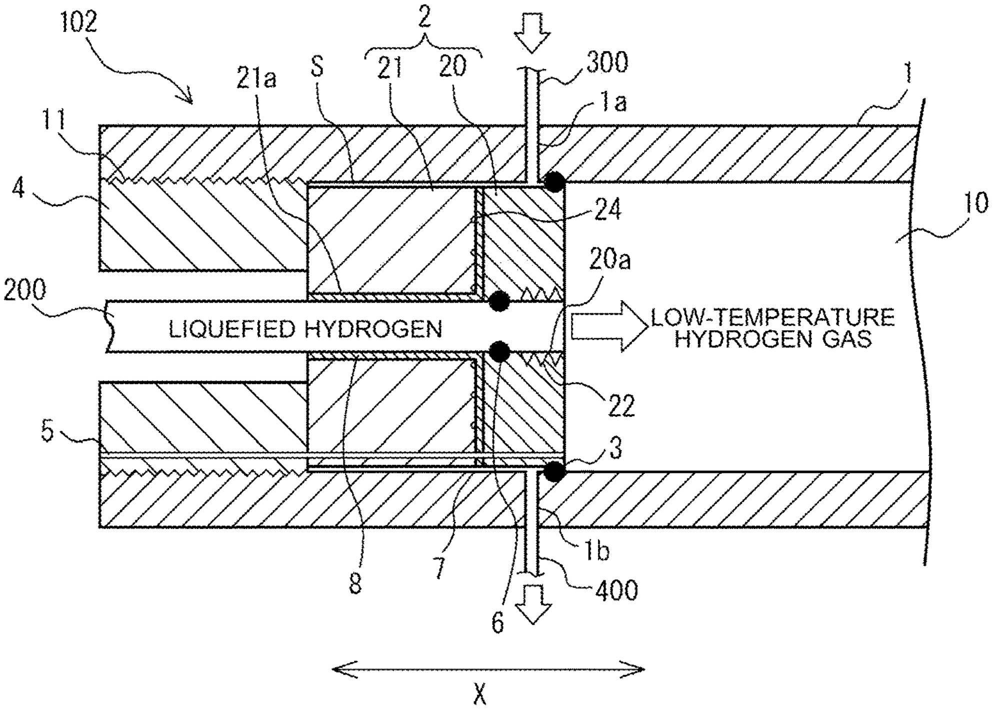
FIG. 5 is a cross-sectional view schematically showing the internal structure of one end of a pressure accumulator according to Embodiment 3.
Figure 6:
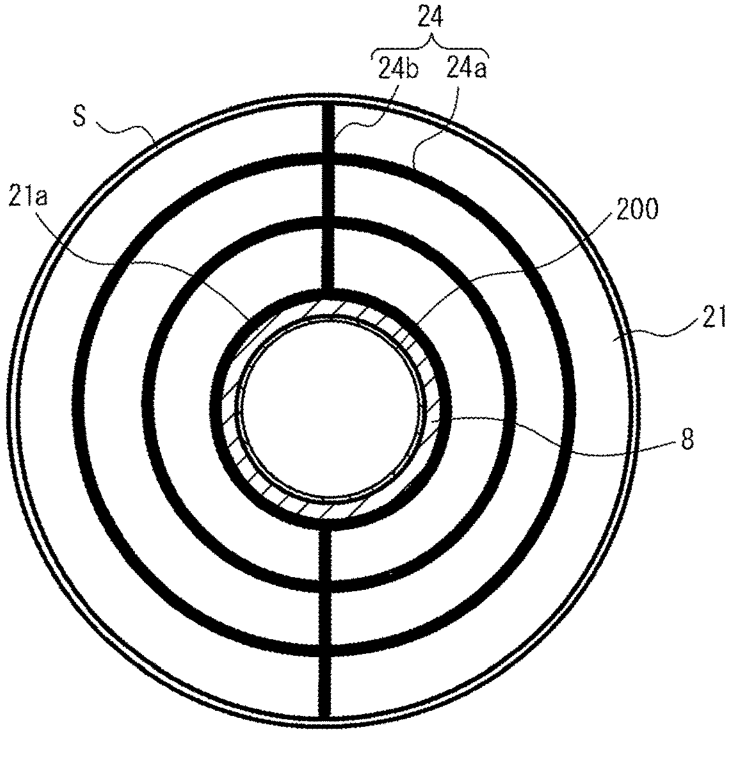
FIG. 6 is a diagram schematically illustrating an end surface of an outer lid body of the pressure accumulator according to Embodiment 3.

Next, a pressure accumulator 102 according to Embodiment 3 will be described with reference to FIG. 5 and FIG. 6. FIG. 5 is a cross-sectional view schematically showing the internal structure of one end of the pressure accumulator according to Embodiment 3. FIG. 6 is a diagram schematically illustrating the end surface of the outer lid body of the pressure accumulator according to Embodiment 3. Constitutional elements identical to the corresponding constitutional elements of the pressure accumulators 100, 101 described in Embodiments 1 and 2 are given the same reference symbols, and the description of such constitutional elements will be omitted when appropriate.

As shown in FIG. 5, a cylindrical body 1 of the pressure accumulator 102 according to Embodiment 3 has a first vent hole 1*a* and a second vent hole 1*b*, the first vent hole 1*a* allowing the outside of a cylindrical body 1 to communicate with a gap S to inject gas for heat exchange into the gap S from the outside of the cylindrical body 1, the second vent hole 1*b* allowing the outside of the cylindrical body 1 to communicate with the gap S to discharge the gas injected into the gap S through the first vent hole 1*a* to the outside of the cylindrical body 1. An injection pipe 300 through which gas is injected is connected to the first vent hole 1*a*. A discharge pipe 400 through which gas is discharged is connected to the second vent hole 1*b*. An example of the gas is inert air, and it is preferable to use dehumidified gas if possible. The gas may be an inert gas, or may be other gases. The gas is injected into the gap S by being pressurized by a power device, such as a compressor, circulates through the gap S, and is then discharged to the outside of the cylindrical body 1. In the pressure accumulator 102 according to Embodiment 3, by causing gas to flow into the gap S, the gas layer forms a heat-insulating layer, thus increasing an effect of suppressing heat conduction from the lid body 2 to the cylindrical body 1. In the pressure accumulator 102, even if a situation occurs in which hydrogen gas stored in the storage space 10 of the cylindrical body 1 leaks to a portion of the gap S, the leaked hydrogen gas can be discharged through the second vent hole 1*b*.

The lid body 2 includes an inner lid body 20 and an outer lid body 21, the inner lid body 20 being made of austenitic stainless steel, and being disposed at a position close to the storage space of the cylindrical body 1, the outer lid body 21 being made of low alloy steel, and being disposed at a position close to a fixing part. Of the end surface of the inner lid body 20 and the end surface of the outer lid body 21 that face each other, the end surface of the outer lid body 21 has a groove portion 24 that causes gas injected into the gap S from the outside of the cylindrical body 1 to circulate on the end surface of the outer lid body 21.

In FIG. 6, thick line portions show the groove portion 24. As shown in FIG. 6, the groove portion 24 includes a plurality of annular groove portions 24*a* and a straight-line-shaped coupling groove portion 24*b* that connects the plurality of annular groove portions 24*a* to each other. In the case of the example shown in the drawing, the plurality of annular groove portions 24*a* are formed by three circles that enclose the outer periphery of the through hole 21*a*. The three circles are formed such that large circles enclose the outer periphery of a small circle at substantially equal intervals. The coupling groove portion 24*b* has both end portions thereof communicating with the gap S, and is formed to extend in the radial direction in such a way as to connect the three circles to each other. Gas injected into the gap S enters the coupling groove portion 24*b* from one end portion of the coupling groove portion 24*b* and flows through the annular groove portions 24*a* and, thereafter, is discharged to the gap S from the other end of the coupling groove portion 24*b*. The gas injected into the gap S from the outside of the cylindrical body 1 circulates through the groove portion 24 as described above and hence, the gas layer forms a heat-insulating layer, thus increasing an effect of suppressing heat conduction from the inner lid body 20 to the outer lid body 21. When gas is dry air, even if the temperature of the gas is lowered at the time of performing heat exchange, dew condensation and freezing will not occur in the groove portion 24 of the lid body 21.

Although not shown in the drawing, of the end surface of the inner lid body 20 and the end surface of the outer lid body 21 that face each other, the end surface of the inner lid body 20 may have the groove portion 24. Further, of the end surface of the inner lid body 20 and the end surface of the outer lid body 21 that face each other, each of both end surfaces may have the groove portion 24.

The groove portion 24 is not limited to the shape shown in the drawing. For example, the annular groove portions 24*a* are not limited to a circular shape, and may have a rectangular shape or other shapes. The coupling groove portion 24*b* is not limited to a straight line shape, and may have a curved shape, a zigzag shape, or other shapes. Further, the groove portion 24 may have, for example, a lattice shape or a spiral shape, or may have other shapes. In short, provided that the groove portion 24 can cause gas injected into the gap S from the outside of the cylindrical body 1 to circulate through the end surface of the inner lid body 20 or the end surface of the outer lid body 21, the groove portion 24 may have any shape.

In the pressure accumulator 102, it is desirable that, of the end surface of the inner lid body 20 and the end surface of the outer lid body 21 that face each other, either one of the end surface of the inner lid body 20 or the end surface of the outer lid body 21 or both of the end surface of the inner lid body 20 and the end surface of the outer lid body 21 be provided with the groove portion 24. However, the groove portion 24 is not always necessary to be provided, and may be omitted.

As shown in FIG. 3 and FIG. 4, for example, the pressure accumulator 102 is also applicable to a configuration in which the lid body 2 is made of only austenitic stainless steel. However, in this case, the groove portion 24 shown in FIG. 5 and FIG. 6 is omitted.

The pressure accumulator 102 may be configured to perform a control of determining conditions of gas to be injected into the gap S based on the detected value from the temperature detection unit 5. Examples of conditions of gas include flow rate, flow velocity, injection time, and the like. The pressure accumulator 102 is not always necessary to determine the conditions of gas to be injected into the gap S based on the detected value from the temperature detection unit 5, and may determine the conditions of gas to be injected into the gap S by using other detection units.

The pressure accumulators (100, 100A, 101, 101A, 102) have been described based on Embodiments heretofore. However, the pressure accumulators (100, 100A, 101, 101A, 102) are not limited to the configurations of the above-described Embodiments. The configurations of the above-mentioned pressure accumulators (100, 100A, 101, 101A, 102) are merely examples, and may include other constitutional elements. In short, the pressure accumulators (100, 100A, 101, 101A, 102) include variations to which design changes or applications are normally added by those who are skilled in the art without departing from the technical concept.

REFERENCE SIGNS LIST

1: cylindrical body, 1*a*: first vent hole, 1*b*: second vent hole, 2: lid body, 2*a*: through hole, 3: sealing structure portion, 4: fixing part, 5: temperature detection unit, 6: sealing part, 7, 8, 9: heat insulating part, 10: storage space, 11: female screw portion, 20: inner lid body, 20*a*: through hole, 21: outer lid body, 21*a*: through hole, 22: screw fastening portion, 23: welding-fixing portion, 24: groove portion, 24*a*: annular groove portion, 24*b*: coupling groove portion, 100, 100A, 101, 101A, 102: pressure accumulator, 200: pipe, 300: injection pipe, 400: discharge pipe, S: gap.

The invention claimed is:

1. A pressure accumulator that causes a liquefied gas at a very low temperature that has been injected into the pressure accumulator from an outside through a pipe to vaporize and stores the liquefied gas, the pressure accumulator comprising:

a cylindrical body made of metal and configured to vaporize and store the liquefied gas in a storage space in the cylindrical body;

a lid body having a through hole that allows the pipe to penetrate through the through hole, the lid body being configured to fix the pipe passing through the through hole, and being configured to close an opening end portion of the cylindrical body with a gap provided between the lid body and an inner peripheral surface of the cylindrical body, the gap communicating with the storage space of the cylindrical body;

a sealing structure portion provided between an outer peripheral portion of the lid body and an inner peripheral portion of the cylindrical body, the sealing structure portion being configured to fill in at least a portion of the gap;

a fixing part provided at the opening end portion of the cylindrical body, an outer peripheral surface of the fixing part being screw fastened to the inner peripheral surface of the cylindrical body to support and fix the lid body from an outer side of the lid body; and a heat insulating part provided between the lid body and the fixing part, wherein the lid body is provided entirely inward of the fixing part relative to an axial direction of the cylindrical body such that the fixing part and the lid body do not overlap along a radial direction of the cylindrical body.

2. The pressure accumulator of claim 1, wherein the lid body includes a screw fastening portion configured to cause the pipe passing through the through hole to be fixed by screw fastening, and a sealing part is provided between an inner peripheral portion of the lid body and an outer peripheral portion of the pipe to close a space formed between the inner peripheral portion of the lid body and the outer peripheral portion of the pipe.

3. The pressure accumulator of claim 1, wherein the lid body includes a welding-fixing portion at which the pipe passing through the through hole can be fixed by welding.

4. The pressure accumulator of claim 1, wherein the lid body is made of austenitic stainless steel.

5. The pressure accumulator of claim 1, further comprising a temperature detection unit configured to detect a temperature of a liquefied gas, which is vaporized, stored in the storage space of the cylindrical body, or a temperature of the lid body.

6. The pressure accumulator of claim 1, wherein the lid body includes a screw fastening portion configured to cause the pipe passing through the through hole to be fixed by screw fastening, a sealing part is provided between an inner peripheral portion of the lid body and an outer peripheral portion of the pipe to close a space formed between the inner peripheral portion of the lid body and the outer peripheral portion of the pipe, and the lid body is made of austenitic stainless steel.

7. The pressure accumulator of claim 1, wherein the lid body includes a welding-fixing portion at which the pipe passing through the through hole can be fixed by welding, and the lid body is made of austenitic stainless steel.

8. A pressure accumulator that causes a liquefied gas at a very low temperature that has been injected into the pressure accumulator from an outside through a pipe to vaporize and stores the liquefied gas, the pressure accumulator comprising:

a cylindrical body made of metal and configured to vaporize and store the liquefied gas in a storage space in the cylindrical body;

a lid body having a through hole that allows the pipe to penetrate through the through hole, the lid body being configured to fix the pipe passing through the through hole, and being configured to close an opening end portion of the cylindrical body with a gap provided between the lid body and an inner peripheral surface of the cylindrical body, the gap communicating with the storage space of the cylindrical body;

a sealing structure portion provided between an outer peripheral portion of the lid body and an inner peripheral portion of the cylindrical body, the sealing structure portion being configured to fill in at least a portion of the gap; and a fixing part provided at the opening end portion of the cylindrical body, an outer peripheral surface of the fixing part being screw fastened to the inner peripheral surface of the cylindrical body to support and fix the lid body from an outer side of the lid body, wherein the lid body is provided entirely inward of the fixing part relative to an axial direction of the cylindrical body such that the fixing part and the lid body do not overlap along a radial direction of the cylindrical body, and the lid body includes an inner lid body made of austenitic stainless steel, and disposed at a position close to the storage space of the cylindrical body, and an outer lid body made of low alloy steel, and disposed at a position close to the fixing part.

9. The pressure accumulator of claim 8, wherein a heat insulating part is provided between the inner lid body and the outer lid body, and a heat insulating part is provided between the outer lid body and the pipe.

10. The pressure accumulator of claim 8, wherein the cylindrical body includes a first vent hole configured to cause an outside of the cylindrical body to communicate with the gap to inject a gas into the gap from the outside of the cylindrical body, and a second vent hole configured to cause the outside of the cylindrical body to communicate with the gap to discharge the gas injected into the gap through the first vent hole to the outside of the cylindrical body.

11. The pressure accumulator of claim 10, wherein of an end surface of the inner lid body and an end surface of the outer lid body that face each other, either one of the end surface of the inner lid body or the end surface of the outer lid body or both of the end surface of the inner lid body and the end surface of the outer lid body has a groove portion through which the gas injected into the gap circulates.

12. The pressure accumulator of claim 11, wherein the groove portion includes a plurality of annular groove portions, and a coupling groove portion communicating with the gap and configured to connect the plurality of annular groove portions to each other.

13. The pressure accumulator of claim 8, wherein the lid body includes a screw fastening portion configured to cause the pipe passing through the through hole to be fixed by screw fastening, and a sealing part is provided between an inner peripheral portion of the lid body and an outer peripheral portion of the pipe to close a space formed between the inner peripheral portion of the lid body and the outer peripheral portion of the pipe.

14. The pressure accumulator of claim 8, wherein the lid body includes a welding-fixing portion at which the pipe passing through the through hole can be fixed by welding.

15. The pressure accumulator of claim 8, wherein the lid body includes a screw fastening portion configured to cause the pipe passing through the through hole to be fixed by screw fastening, a sealing part is provided between an inner peripheral portion of the lid body and an outer peripheral portion of the pipe to close a space formed between the inner peripheral portion of the lid body and the outer peripheral portion of the pipe, and a first heat insulating part is provided between the inner lid body and the outer lid body, and a second heat insulating part is provided between the outer lid body and the pipe.

16. The pressure accumulator of claim 8, wherein the lid body includes a welding-fixing portion at which the pipe passing through the through hole can be fixed by welding, and a first heat insulating part is provided between the inner lid body and the outer lid body, and a second heat insulating part is provided between the outer lid body and the pipe.

* * * * *